(12) United States Patent
Draper et al.

(10) Patent No.: US 7,523,963 B2
(45) Date of Patent: Apr. 28, 2009

(54) SPLIT RING ASSEMBLY TO LOCK A CAM PIPE COUPLING

(76) Inventors: Garry D. Draper, P.O. Box 1992, St. Paul, Alberta, T0A 2A0 (CA); Robert T. Valiquette, 5105 54 Avenue, St. Paul, Alberta, T0A 3A1 (CA)

( * ) Notice: Subject to any disclaimer, the term of this patent is extended or adjusted under 35 U.S.C. 154(b) by 0 days.

(21) Appl. No.: 11/848,468

(22) Filed: Aug. 31, 2007

(65) Prior Publication Data

US 2008/0054637 A1    Mar. 6, 2008

Related U.S. Application Data

(63) Continuation-in-part of application No. 11/514,037, filed on Sep. 1, 2006.

(51) Int. Cl.
*F16L 35/00* (2006.01)
*F16L 37/18* (2006.01)

(52) U.S. Cl. .............................. 285/88; 285/80; 285/87; 285/312; 285/420

(58) Field of Classification Search ................ 285/1, 285/80, 148.28, 311, 312, 320, 409, 410, 285/411, 420, 82, 87, 88
See application file for complete search history.

(56) References Cited

U.S. PATENT DOCUMENTS

| 627,987 | A | * | 7/1899 | Dick ............................ 24/271 |
| 1,185,487 | A | * | 5/1916 | Eastman ...................... 285/119 |
| 1,518,479 | A | * | 12/1924 | Brewer ........................ 285/409 |
| 1,966,039 | A | * | 7/1934 | Muchnic ................... 285/135.5 |
| 2,731,280 | A | * | 1/1956 | Goodliffe et al. ............ 285/372 |
| 2,994,934 | A | * | 8/1961 | Kraus ........................... 24/271 |
| 3,124,374 | A | | 3/1964 | Krapp |
| 3,195,934 | A | | 7/1965 | Parrish |
| 3,379,460 | A | | 4/1968 | Allyn |
| 3,860,274 | A | | 1/1975 | Ledstrom et al. |
| 3,976,313 | A | | 8/1976 | Lauffenburger et al. |
| 4,222,593 | A | * | 9/1980 | Lauffenburger ............... 285/85 |
| 4,295,670 | A | | 10/1981 | Goodall et al. |
| 4,392,513 | A | | 7/1983 | Parrish |
| 4,969,923 | A | * | 11/1990 | Reeder et al. ................ 285/365 |
| 5,462,316 | A | * | 10/1995 | Street et al. .................... 285/81 |
| 5,509,702 | A | * | 4/1996 | Warehime et al. ........... 285/409 |
| 5,513,555 | A | | 5/1996 | Plank et al. |
| 5,568,946 | A | * | 10/1996 | Jackowski .................... 285/38 |
| 5,586,367 | A | * | 12/1996 | Benoit ...................... 24/68 SK |

(Continued)

*Primary Examiner*—James M Hewitt
(74) *Attorney, Agent, or Firm*—Davis & Bujold, P.L.L.C.

(57) ABSTRACT

A split ring assembly for maintaining a releasable pipe coupling, of the type having a female portion having two pivoted opposite cam lever arms and a circumferentially grooved male portion, in an engaged position comprising: two generally semicircular ring portions hinged together on one side and provided with a latch mechanism on a diametrically opposite side; wherein each ring portion is notched to receive a swinging end portion of one of the cam lever arms; and wherein each ring portion is sized to closely surround the female portion of the pipe coupling. Then when the ring assembly surrounds said female portion and the pivoted arms, closing the latch mechanism visibly ensures that the coupling portions remain locked together. The split ring assembly is a rugged visibly convincing assurance that a coupling will not inopportunely open. It can be manipulated by an operator wearing heavy gloves in subzero weather or during a snow storm.

16 Claims, 1 Drawing Sheet

U.S. PATENT DOCUMENTS

| | | | |
|---|---|---|---|
| 5,692,544 A * | 12/1997 | Friedrich et al. | 138/99 |
| 5,967,174 A | 10/1999 | MacDonald | |
| 5,988,693 A * | 11/1999 | Street | 285/80 |
| 6,112,761 A | 9/2000 | Scotto | |
| 6,164,708 A * | 12/2000 | Lin | 285/323 |
| 6,290,267 B1 | 9/2001 | Swingley | |
| 6,543,812 B1 * | 4/2003 | Chang | 285/81 |
| 6,694,783 B2 | 2/2004 | Trempala | |
| 6,834,888 B2 * | 12/2004 | Campau | 285/81 |

* cited by examiner

US 7,523,963 B2

SPLIT RING ASSEMBLY TO LOCK A CAM PIPE COUPLING

The present application is a continuation-in-part application of U.S. patent application Ser. No. 11/514,037, filed Sep. 1, 2006.

FIELD

This patent document relates to cam pipe couplings. More particularly this invention relates to a substantial apparatus used to maintain the cam lever arms or ears in a locked position.

BACKGROUND

Cam pipe couplings are usually used to detachably couple a flexible hose to a solid walled pipe line. An end portion of the solid walled pipe line usually is provided with a valve before terminating in the female portion of the cam coupling. It is the female portion of the cam coupling which contains diametrically opposite cams which are moved by lever arms, or "ears" to releasably lock the male portion therein.

Cam couplings are frequently used to removably couple a flexible hose to a storage tank or to a smaller tank on a truck. In the oil industry it is critical that the couplings stay coupled when oil is being pumped through a flexible hose which is attached to the male end portion of the pipe coupling. A spill even of a few gallons of oil must be reported and typically costs thousands of dollars to clean up.

After the flexible hose is removed from the female portion of the coupling (having the lever arms attached thereto) it is common practice to insert a similar mating male portion of the coupling therein which is either plugged or capped. This is done as an added safeguard against the valve either opening or leaking.

Devices are available to lock the lever arms of a cam coupler in a closed position.

SUMMARY

There is provided split ring assembly for maintaining a releasable pipe coupling. The releasable pipe coupling has a female portion having cam levers, and a male portion having a flange and a locking groove positioned between a first end and the flange. The cam levers engage the locking groove in a closed position. The split ring assembly has a hinged body having a first end and a second end. The hinged body has an open position, a closed position, and a latch for maintaining the hinged body in the closed position. The first end has recesses for receiving the cam levers such that, when both the cam levers and the hinged body are in the closed position, the recesses pivotally secure the cam levers. The second end has an inward extending surface that is received between the flange and the locking groove in the closed position such that the hinged body is axially secured on the releasable pipe coupling.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
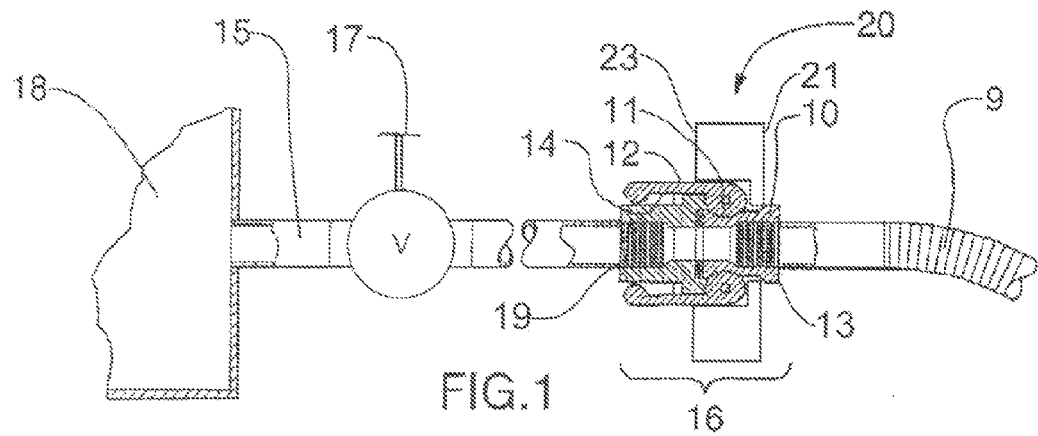
FIG. 1 is a side elevation view in cross section of a storage tank having a cam coupling and a split ring assembly positioned thereon to lock the cam coupling in a closed position.

Referring to FIG. 1, there is shown a storage tank 18 having a cam coupling 16 and a split ring assembly 20 positioned thereon to lock the cam coupling 16 in a closed position. The split ring assembly 20, which may be made from aluminum or any other suitable material, maintains a releasable pipe coupling 16 in an engaged position. Typically, a tank 18 has an output routed through a solid walled pipe 15 and a valve 17. The solid walled pipe 15 is connected to a flexible hose by a cam coupling. The cam coupling 16 has a female portion 14 positioned on the end of the pipe 15 and a male portion 10 positioned on the end of a hose 9. Male portion 10 has a circumferential groove 11 and an outwardly extending flange 13. The circumferential groove 11 is positioned between the flange 13, and the end of the coupling. The female portion 14 has two pivoted opposite cam lever arms 12 that engage the groove 11 when closed, as shown, and release the groove 11 and thus male portion 10 when opened.

Figure 2:
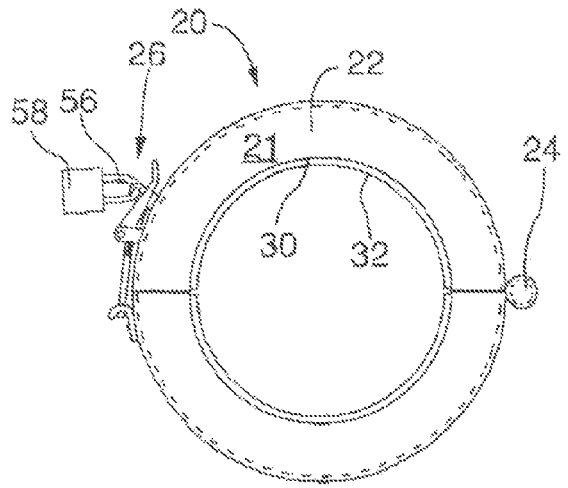
FIG. 2 is an end elevation view of the split ring assembly shown in FIG. 1 as viewed from a threaded end portion of the female portion of the pipe coupling.
Figure 3:
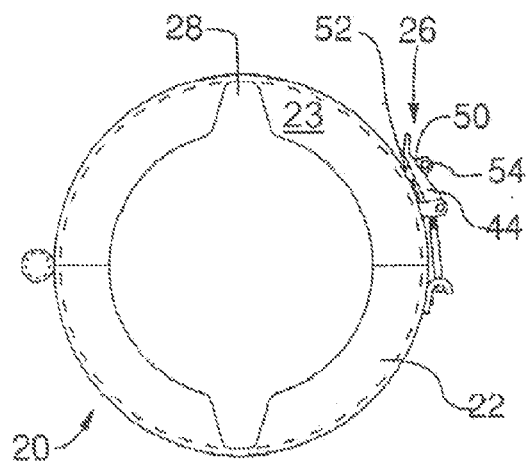
FIG. 3 is an end elevation view of the split ring assembly shown in FIG. 1 as viewed from the opposite male end portion of the pipe coupling.

FIG. 3 is an elevational view of a first end 23 of the split ring assembly 20 shown in FIG. 1. FIG. 2 is an elevational view of a second end 21 of the split ring assembly 20. Referring to FIGS. 2 and 3, the split ring assembly 20 is made up of a hinged housing with two generally semicircular ring portions 22 connected by a hinge 24 on one side and provided with a latch mechanism 26 on a side diametrically opposite the hinge 24. Each ring portion 22 has a notch 28 in first end 23 to receive a swinging end portion of one of the cam lever arms 12. Each ring portion 22 is sized to closely surround the female portion 14 of the pipe coupling 16. When the split ring assembly 20 is closed about the female portion 14 and the pivoted arms 12, the latch mechanism 26 can then be closed there such that the user is visibly assured that the female and male coupling portions 14 and 10 are locked. It will be understood that the split ring assembly 20 may be used in various situations beyond the example shown in FIG. 1 when it is desirable to secure a cam lock.

In the embodiment shown in FIG. 1, the female portion 14 of the pipe coupling 16 has a threaded end portion 19. Referring to FIG. 2, the second end 21 of the split ring assembly 20, which is furthest from the threaded end portion 19, has a smaller inner diameter 30 than the other opposite end 23. The smaller inner diameter 30 is intended to be received between the flange 13 and the cam lever arms 12 in order to maintain the split ring assembly 20 on cam coupling 16, and prevent it from sliding off. The other opposite wall side portion is notched 28 to closely accommodate an end portion of the cam lever arms 12 when and only the cam lever arms 12 are in a closed position.

The split ring assembly 20 may also have inserts 32 that are carried by an inner surface of the second end 21 furthest from the threaded end portion of the female portion 18 of the pipe coupling 16. The inserts 32 are able to frictionally engage the male portion 10 of the pipe coupling 16 between the flange 13 and the cam lever arms 12 when in a locking position, and are made from a material such as neoprene, plastic or rubber. The inserts 32 are U shaped, such that the inner portion of the second end 21 furthest from the threaded end portion 19 of the female portion 14 of the pipe coupling 16 is engaged by the insert.

Figure 4:
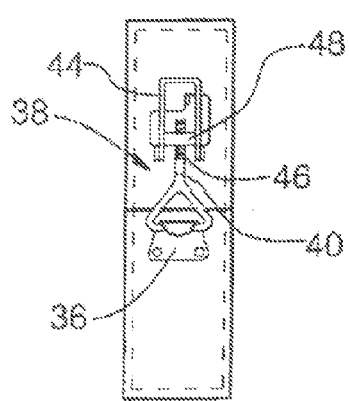
FIG. 4 is a side elevation view of the split ring assembly, showing the latch mechanism.

FIG. 4 is a side view of the split ring assembly 20 showing the latch mechanism 26. There are many different latch mechanisms that can be used as will be understood by those skilled in the art. The latch mechanism 26 shown includes a hook side portion 36, and an opposite arm side portion 38 which has an arm 40 terminating in a loop 42 to engage said hook side portion 36. The arm 40 is pivotally carried by a lever 44 so that when said arm 40 is pulled to a closed position by the lever 44, the split ring portions 22 are forcefully pulled together. Opposite the loop 42 on arm 40 is an externally threaded end portion 46. The threaded arm end portion 46 engages an internal thread 48 so that the tightness of the closed split coupling 20 can be adjusted by turning said arm 40 within the internal thread 48.

Referring to FIG. 3, the latch mechanism 26 may also have a clasp lever 44 having a clasp opening 50. A lock clasp 52 attached to the split ring 22 having a lock shackle opening 54 protrudes through the clasp opening 52 when in the closed position. Referring to FIG. 2, when the clasp arm 40 is closed and a lock shackle 56 is positioned to penetrate the lock shackle opening 54, the clasp lever 44 cannot be moved to an open position, reducing the possibility of theft and vandalism.

Referring to FIG. 1, a general method of securing a releasable pipe coupling 16, of the type having a female end portion 14 having cam lever arms 12 pivoted thereto, and a male end portion 10 having a circumferential groove therearound, remains in an engaged position starts by providing a split ring assembly 20 as described above. The split ring assembly 20 is then positioned over the female end portion 14 of a pipe coupling 16, with the cam lever arms 12 in the closed position such that they engage the circumferential groove 11 of the male end portion 10. The clasp mechanism 26 shown in FIG. 2 is then closed. This method may employ any of the variations described above.

Figure 5:
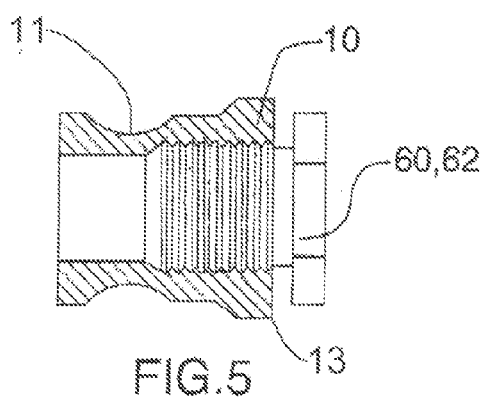
FIG. 5 is a cross sectional view of a blocked off male portion of a cam coupling.

FIG. 5 is a cross sectional view of a blocked off male portion 10 of a cam coupling 16. The male end portion of the coupling may be closed 60 either with a plug 62 or a cap (not shown) if the coupling 16 terminates in an external rather than an internal thread. The closed male portion 10 of the coupling 16 (as shown in FIG. 5) replaces the hose 9 for safety and to prevent theft. Referring to FIG. 4, when an end portion of the arm 40 terminating in a loop 42 comprises an externally threaded end portion 46 then the method further comprises the step of adjusting the arm 40 terminating in a loop 42 for length by turning said arm 40 within the internal thread 48. Referring to FIGS. 2 and 3, when the clasp lever 44 is provided with a clasp opening 50 therethrough and the lock clasp 52 has a lock shackle opening 54 then the method further comprises the steps of providing a male end portion of a pipe coupling 10 having a circumferential groove therearound which has a closed threaded end portion 60, and a padlock 58 having a shackle 56. Once the closed male end portion 10 of the coupling 16 is positioned within the female end portion 14 of the coupling 16, and the clasp mechanism 26 is closed, the shackle 56 of the padlock 58 is attached through the lock shackle opening 54 and engaging the padlock 58. The lever 44 is thus prevented from moving from a closed position thereby preventing potential theft and vandalism.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

We claim:

1. A split ring assembly in combination with a releasable pipe coupling, the releasable pipe coupling comprising:
   a female portion having cam levers; and
   a male portion having a flange and a locking groove positioned between a first end and the flange, the cam levers engaging the locking groove in a closed position; and
   the split ring assembly comprising:
   a hinged body having a first end and a second end, the hinged body having an open position, a closed position, and a latch for maintaining the hinged body in the closed position;
   the first end having recesses for receiving the cam levers such that, when both the cam levers and the hinged body are in the closed position, the recesses secure the cam levers; and
   the second end having an inward extending surface that is received between the flange and the locking groove in the closed position such that the hinged body is axially secured on the releasable pipe coupling.

2. The split ring assembly of claim 1, wherein the second end of the hinged body has a smaller inner diameter than the first end of the hinged body.

3. The split ring assembly of claim 1, further comprising a resilient insert carried on an inner surface of the second end of the hinged body, the resilient insert frictionally engaging the male portion of the releasable pipe coupling.

4. The split ring assembly of claim 3, wherein the resilient insert has a U shaped cross section.

5. The split ring assembly of claim 1, wherein the latch comprises a hook carried by a first portion of the hinged body, and a movable arm carried by a second portion of the hinged body, the movable arm terminating in a loop adapted to engage the hook, the movable arm being pivotally carried by a clasp lever such that that when the arm is pulled to a closed position by the clasp lever, the first and second portions of the hinged body are forcefully pulled together.

6. The split ring assembly of claim 5, wherein the movable arm comprises an externally threaded end portion opposite the loop, the threaded end engaging an internal thread such that the tightness of the closed position can be adjusted by turning the arm within the internal thread.

7. The split ring assembly of claim 6, the latch further comprising a clasp lever having a clasp opening therethrough and a lock clasp attached to the hinged body having a lock shackle opening protruding through the clasp opening so that when the clasp arm is closed and a lock shackle penetrates the lock shackle opening, the clasp lever cannot be moved to an open position.

8. The split ring assembly of claim 1, wherein the hinged body is made from aluminum.

9. A method of securing a releasable pipe coupling, the releasable pipe coupling comprising:
   a female portion having cam levers; and
   a male portion having a flange and a locking groove positioned between a first end and the flange, the cam levers engaging the locking groove in a closed position; and
   the method comprising the steps of:
   closing the cam levers;

providing a split ring assembly comprising a hinged body having a first end and a second end, the hinged body having an open position, a closed position, and a latch for maintaining the hinged body in the closed position, the first end having recesses for receiving the cam levers, the second end having an inward extending surface;

closing the hinged body about the releasable pipe coupling such that the recesses pivotally secure the cam levers and such that the inward extending surface is received between the flange and the locking groove to axially secure the hinged body on the releasable pipe coupling; and closing the latch.

10. The method of claim 9, wherein the second end of the hinged body has a smaller inner diameter than the first end of the hinged body.

11. The method of claim 9, wherein the hinged body further comprises a resilient insert carried on an inner surface of the second end of the hinged body, the resilient insert frictionally engaging the male portion of the releasable pipe coupling.

12. The method of claim 9, wherein the resilient insert has a U shaped cross section.

13. The method of claim 12, wherein the latch comprises a hook carried by a first portion of the hinged body, and a movable an arm carried by a second portion of the hinged body, the movable arm terminating in a loop adapted to engage the hook, the movable arm being pivotally carried by a clasp lever and further comprising the step of engaging the loop with the hook and then pulling the arm to a closed position with the lever, so that the first and second portions of the hinged body are forcefully pulled together.

14. The method of claim 13, wherein the movable arm comprises an externally threaded end portion opposite the loop, the threaded end engaging an internal thread, the method further comprising the step of adjusting the length of the arm by turning the arm within the internal thread.

15. The method of claim 14 wherein the latch further comprises a clasp lever having a clasp opening therethrough and a lock clasp attached to the hinged body having a lock shackle opening protruding through the clasp opening, the method further comprising the step of attaching a padlock through the lock shackle opening and engaging the padlock; thereby preventing the lever arm from moving from the closed position.

16. The method of claim 15, wherein the hinged body is made from aluminum.

* * * * *